Aug. 20, 1968    M. H. GOTTLIEB    3,398,025
NICKEL-CADMIUM BATTERY ELECTRODES
Filed Oct. 14, 1965
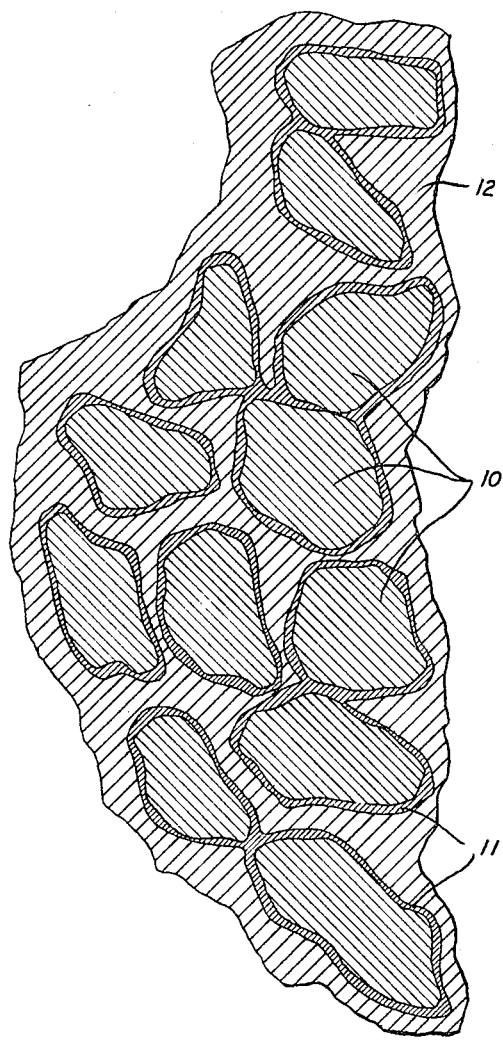
INVENTOR
M. H. GOTTLIEB
BY
ATTORNEY

United States Patent Office 3,398,025
Patented Aug. 20, 1968

3,398,025
NICKEL-CADMIUM BATTERY ELECTRODES
Melvin H. Gottlieb, Wheaton, Md., assignor to Bell Telephone Laboratories, Incorporated, New York, N.Y., a corporation of New York
Filed Oct. 14, 1965, Ser. No. 496,009
4 Claims. (Cl. 136—120)

This invention relates to the manufacture of battery plates for sealed alkaline cells.

Excessive internal gas pressures evolved via the electrochemical mechanism particularly during overcharge continues to be a principal problem in the design of long life alkaline batteries, particularly nickel-cadmium cells.

Oxygen produced at the anode will recombine at the cathode by a depolarization mechanism and generally does not create a problem. Hydrogen produced at the cathode will similarly react at the anode but at an extremely slow rate. Consequently if significant hydrogen evolution is permitted the gas will accumulate causing internal pressures within the sealed enclosure. Attempts have been made to effectuate recombination of hydrogen within the confines of the cell which have been largely unsuccessful.

One particularly successful and widely used expedient for avoiding hydrogen evolution is to construct the cell with an excess negative capacity. As long as uncharged material remains on the cathode during charging the cathode electrolysis reaction will not occur and hydrogen will not be evolved. This is described and claimed in U.S. Patent 2,571,927.

However, even cell designs embodying the excess negative capacity concept are subject to gradual failure due to evolved hydrogen, particularly when exposed to deep cycling and severe temperature conditions.

The observation that the rate of hydrogen evolution, at the potentials experienced during normal charge of the cell, is far greater than would be predicted from literature data on the behavior of solid cadmium, led to the discovery that by pre-coating the cathode sinter with mercury prior to activation, the hydrogen evolution is significantly reduced. This expedient has been found to reduce the rate of hydrogen evolution by a factor of ten for a given electrode potential.

These and other aspects of the invention may perhaps be more readily appreciated from a consideration of the following detailed description. In the drawing:

The figure is a front section of a porous sintered nickel electrode coated with mercury according to the essential feature of this invention and then activated with cadmium.

In the figure the porous nickel sinter 10 is shown in a sectional view. The coating of mercury 11 should cover as much of the nickel surface as possible. The activating material, in this case cadmium metal or cadmium hydroxide, depending upon the state of charge of the electrode, is shown at 12.

The nickel sinter, having a porosity of 70 percent to 90 percent, is obtained in the conventional manner. The mercury coating may be applied in several ways. The sinter may be dipped into mercury. To assure effective coverage in the pores the sinter may be degassed in vacuum and dipped or may be agitated, for instance by ultrasonic energy while immersed. The coating may also be electrodeposited. Application by electroless deposition was found to be effective as illustrated by the following specific embodiment.

The sintered nickel plaque is immersed in a 7 percent solution of mercuric chloride for approximately thirty minutes. Again degassing of the plaque or ultrasonic agitation may be used to insure complete wetting. The mercury is deposited on all surfaces by chemical displacement. The plaque is then impregnated with cadmium hydroxide by standard procedures. It was found that the hydrogen overvoltages of electrodes prepared in this way are about 0.3 volt higher than for electrodes in which the pre-coating procedure is not used. Other characteristics of the electrodes, such as capacity, charge and discharge voltage and stability, are not affected by the pre-coating technique.

The coating thickness is not critical. Thicknesses in the range 30 mg. of mercury per gram of nickel sinter to 300 mg. of mercury per gram of nickel sinter are useful.

Various additional modifications and extensions of this invention will become apparent to those skilled in the art. All such variations and deviations which basically rely on the teachings through which this invention has advanced the art are properly considered within the spirit and scope of this invention.

What is claimed is:
1. A process for the manufacture of negative electrodes for nickel-cadmium cells which comprises producing a nickel sinter plaque consisting essentially of nickel having a porosity of 70 percent to 90 percent, coating said nickel plaque with mercury and impregnating the coated nickel sinter with cadmium hydroxide to activate the electrode.
2. The process of claim 1 wherein the nickel plaque is coated with mercury by immersing the plaque in a mercuric chloride solution.
3. In a nickel-cadmium cell a sintered nickel negative electrode comprising a sintered nickel plaque consisting essentially of nickel, said plaque being coated with mercury and impregnated with cadmium hydroxide.
4. The cell of claim 3 wherein the electrode has a coating having a thickness in the range of 30 mg. of mercury per gram of nickel sinter to 300 mg. of mercury per gram of nickel sinter.

References Cited

UNITED STATES PATENTS

| | | | |
|---|---|---|---|
| 1,139,213 | 5/1915 | Morrison | 136—120 |
| 3,041,388 | 6/1962 | Fukuda et al. | 136—28 |
| 3,236,696 | 2/1966 | Andre | 136—120 X |

WINSTON A. DOUGLAS, *Primary Examiner.*
C. F. LEFEVOUR, *Assistant Examiner.*